United States Patent
Nagasawa

[11] Patent Number: 5,926,224
[45] Date of Patent: Jul. 20, 1999

[54] IMAGING, SYSTEM, VIDEO PROCESSING APPARATUS, ENCODING APPARATUS, ENCODING METHOD, AND METHOD OF REMOVING RANDOM NOISE

[75] Inventor: Tomonori Nagasawa, Kanagawa, Japan

[73] Assignee: Sony Corporation, Tokyo, Japan

[21] Appl. No.: 08/817,342

[22] PCT Filed: Jul. 31, 1996

[86] PCT No.: PCT/JP96/02161

§ 371 Date: Mar. 31, 1997

§ 102(e) Date: Mar. 31, 1997

[87] PCT Pub. No.: WO97/05745

PCT Pub. Date: Feb. 13, 1997

[30] Foreign Application Priority Data

Jul. 31, 1995 [JP] Japan .................................. 7/213037

[51] Int. Cl.[6] .................................................. H04N 7/12
[52] U.S. Cl. .......................... 348/413; 348/229; 348/384; 348/618
[58] Field of Search ..................................... 348/413, 415, 348/416, 409, 402, 401, 400, 390, 384, 699, 607, 608, 678, 683, 618, 229, 445; 364/514 R; H04N 7/12

[56] References Cited

U.S. PATENT DOCUMENTS

| 4,901,150 | 2/1990 | Klingelhofer et al. | 348/618 |
| 5,410,225 | 4/1995 | Ishii et al. | 348/229 |
| 5,436,663 | 7/1995 | Guede | 348/413 |
| 5,446,500 | 8/1995 | Harford | 348/618 |
| 5,493,514 | 2/1996 | Keith et al. | 364/514 R |
| 5,512,958 | 4/1996 | Rzeszewski | 348/607 |
| 5,633,677 | 5/1997 | Okino et al. | 348/229 |
| 5,648,820 | 7/1997 | Naka et al. | 348/445 |
| 5,661,524 | 8/1967 | Murdock et al. | 348/416 |
| 5,675,386 | 10/1997 | Lee et al. | 348/416 |
| 5,694,170 | 12/1997 | Tiwari et al. | 348/390 |
| 5,706,054 | 1/1998 | Hannan | 348/402 |

FOREIGN PATENT DOCUMENTS

| 0 576 289 | 12/1993 | European Pat. Off. . |
| 5-268636 | 10/1993 | Japan . |
| 6-983314 | 4/1994 | Japan . |

Primary Examiner—Bryan Tung
Assistant Examiner—Gims Philippe
Attorney, Agent, or Firm—Frommer Lawrence & Haug, LLP; William S. Frommer

[57] ABSTRACT

Since, in an imaging apparatus, a bit rate encoder for compressing and encoding a video data obtained by image pickup has a filter circuit for removing a random noise included in the video data and an encoder circuit for high-efficiency-encoding a filtered video data and since a filtering characteristic of the filter circuit is increased in response to an increased gain of the video data obtained by image pickup, it is possible to reduce a random noise presented when the gain is increased, and to reduce encoding bits to be allocated to the random noise. Therefore, it is possible to secure sufficient bits to be allocated to video data upon the encoding and to prevent a picture quality from being deteriorated because of lack of allocated bits upon the encoding.

22 Claims, 5 Drawing Sheets

IMAGING, SYSTEM, VIDEO PROCESSING APPARATUS, ENCODING APPARATUS, ENCODING METHOD, AND METHOD OF REMOVING RANDOM NOISE

TECHNICAL FIELD

The present invention relates to an imaging apparatus and a technique which is applied to a single-unit video-camera recorder for compressing a video data by using motion compensation to record compressed video data and in which, even if a gain is changed, change of a noise suppression level carried out together with a gain control of the image pickup result prevents bits allocated based on an image pickup result from being concentrated on noise components.

BACKGROUND ART

In an imaging apparatus such as a conventional single-unit video-camera recorder (also called "camcoder") or the like, when a gain increasing processing is carried out by a cameraman's operating an operation unit or automatically carried out, a signal processing block for processing an image pickup result changes a gain to process a video signal, which allows an object lacking for illumination to be reliably imaged.

Recently, a picture compression technique for a moving picture is developed. There has been proposed a technique in which a data compression technique according to a moving picture encoding standard such as an MPEG (Moving Picture Experts Group) or the like is applied, data of the video signal can be compressed to about 1/10 in bit rate and the compressed data is recorded on a recording medium such as a video tape, a phase-change magneto-optical disk, a fixed disk or the like, for example.

According to the data compression technique of this kind, difference data obtained by motion compensation between continuous frames or continuous fields is subjected to discrete cosine transform and then quantized. Bits of data used for recording are allocated to the difference data remaining after the motion compensation. Thus, the video data is efficiently recorded by effectively utilizing correlation between the video data of this kind. There has been considered a method of effectively recording the image pickup result in the form of the digital signal by applying such data compression technique to the single-unit video-camera recorder.

When such data compression technique is applied to the imaging apparatus such as the single-unit video-camera recorder, bits are intensively allocated to a random noise after a gain increasing processing, and consequently a picture quality is deteriorated to that extent.

Specifically, in such data compression technique, a motion compensation processing eliminates components which are common in the continuous frames and residual difference data is encoded, thereby data being efficiently stored or transmitted. On the other hand, a noise is generally included at random in a video signal obtained by the imaging apparatus such as the single-unit video-camera recorder. Since such random noise does not provide correlation between the continuous frames, such noise is recognized as "a motion" and hence a large number of bits are allocated to the noise, i.e., bits are intensively allocated thereto.

Further, if such video signal is subjected to the gain increasing processing, the noise is disadvantageously increased to that extent. Especially, when carrying out γ correction, such imaging apparatus outputs the image pickup result whose low luminance part includes an intensive noise. Since the gain increasing processing is frequently carried out when a dark object is imaged, the random noise of the low luminance part is remarkably increased.

Therefore, if the image pickup result whose gain is increased is motion-compensated, then signal components of the random noise included in the difference data are increased to that extent. Consequently, bits of the recording data are intensively allocated to the random noise. As a result, it is observed not only that increase of the random noise resulting from the gain increasing processing deteriorates the picture quality but also that necessary information between frames cannot be transmitted, which remarkably deteriorates the picture quality processing of the recorded digital signal to that extent. Specifically, a pseudo contour or the like is likely to be generated in a picture portion.

While a possible method of solving this problem is a method of eliminating such random noise by applying a noise reduction system, application of the noise reduction system still leaves the problem of resolution deteriorated when the gain increasing processing is not subjected.

In view of the above problems, it is an object of the present invention to propose an imaging apparatus which, even when a gain of a video signal is changed, can prevent bits for an image pickup result from being intensively allocated to a noise.

Moreover, it is another object of the present invention to propose an imaging apparatus which, when a gain is changed, can reduce a noise in proportion to change of the gain.

DISCLOSURE OF THE INVENTION

An imaging system according to the present invention has an imaging device, including
  (a) a gain control means for controlling a gain of a video data output from the imaging device,
  (b) a bit rate encoder having a filter means for suppressing a random noise of the video data whose gain is controlled by the gain control means and an encoder means for encoding the video data filtered by the filter means, and
  (c) a system controller for controlling the gain control means to set the gain of the video data to a gain designated by a cameraman and for controlling the filter means to set a filtering characteristic of the filter means to a filtering characteristic corresponding to the designated gain.

Moreover, an encoding apparatus according to the present invention is one for encoding a video data by a macroblock data unit, including
  (a) an encoding apparatus for encoding a gain of the video data to be encoded,
  (b) a bit rate encoder comprising a filter means for suppressing a noise of a video data whose gain is controlled by the gain control means and an encoder means for encoding the video data filtered by the filter means, and
  (c) a control means for controlling the gain control means so that the gain of the video data to be encoded should be a desired gain and for controlling the filter means so that a filtering characteristic of the filtering means should be a filtering characteristic corresponding to the desired gain.

Moreover, an encoding method according to the present invention is one of encoding a video data by a macroblock unit, including (a) a step of controlling a gain of the video data which is to be encoded to be a desired gain, (b) a step of suppressing a noise by filtering the video data whose gain is controlled, by a filter means whose filtering characteristic is changed so as to be a filtering characteristic corresponding to the desired gain, and (c) a step of encoding the video data subjected to the filtering.

Moreover, a video processing apparatus according to the present invention is used in an imaging means having a gain control means for controlling a gain of a video data to be an optional gain, and a bit rate encoder for compressing the video data in accordance with a moving-picture compression standard, being arranged such that there is provided a filter circuit for utilizing correlation of video data and filtering the video data to thereby suppress a random noise included in the video data, and that the filter circuit changes a filtering characteristic of the filter circuit in response to the gain.

Moreover, a video processing apparatus according to the present invention is used in an imaging system having an imaging block, a signal processing block, and a recording and reproducing block, including a gain control means capable of optionally changing a gain of an imaged data, a filter circuit for filtering the imaged data, and a data compression means for compressing a data of the imaged data, and being arranged such that the filtering reduces a random noise included in the video data by changing a filtering characteristic of the filter circuit in response to a changeover of the gain.

Moreover, a method of removing a random noise included in a video data according to the present invention includes a step of optionally changing a gain of a video data, a step of generating a filtered data from a predetermined video data by a filter means having a filtering characteristic changed in response to a changeover of the gain, a step of compressing a filtered video data, and a step of recording the video data subjected to a picture compression.

BEST MODE FOR CARRYING OUT THE INVENTION

Figure 1:
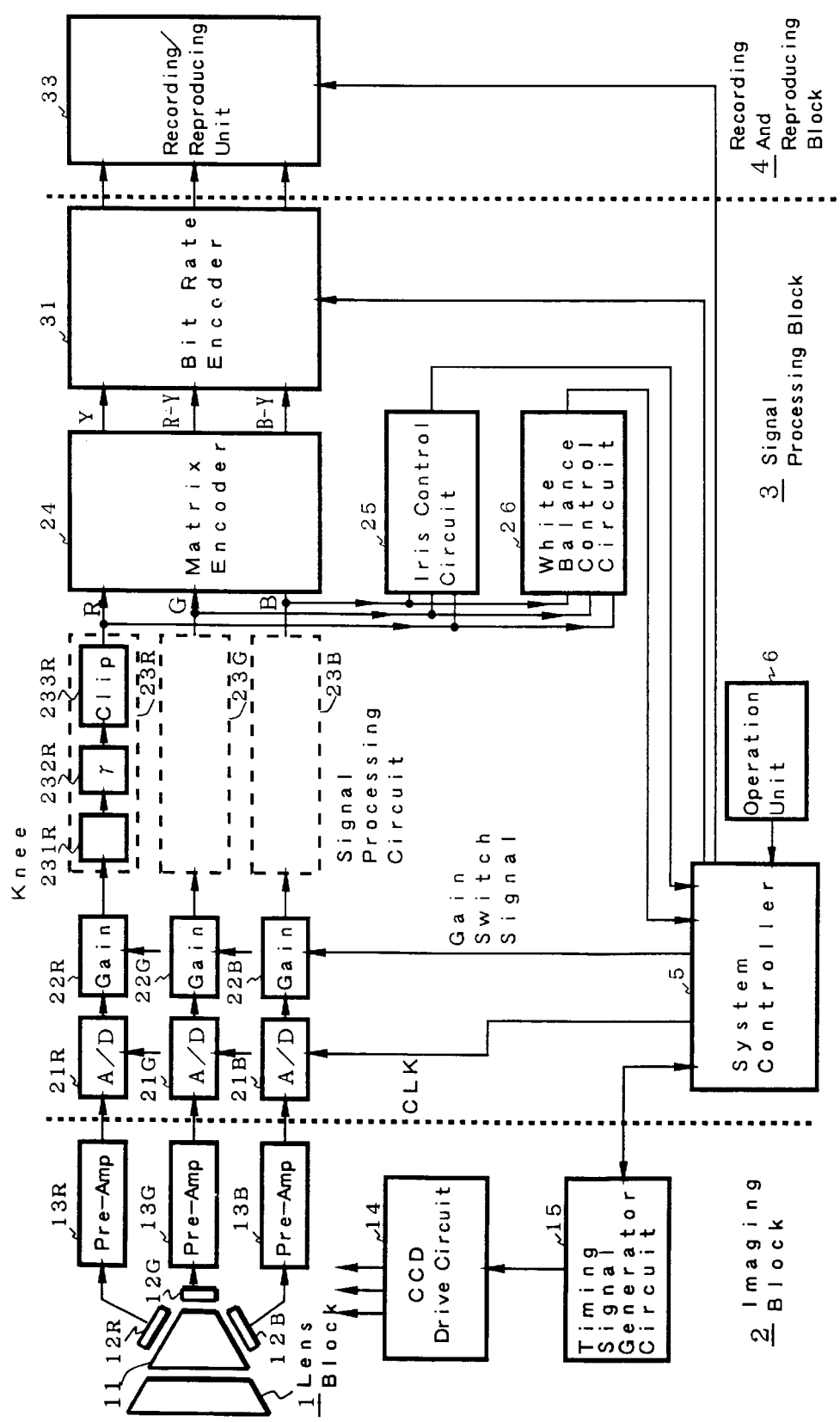
FIG. 1 is a diagram showing a main part of an imaging apparatus of a single-unit video-camera recorder according to an embodiment.

A single-unit video-camera recorder as an embodiment of an imaging apparatus according to the present invention will be described in detail with reference to the accompanying drawings by way of example. The same parts shown in the drawings are marked with the same reference numerals and hence overlapped description thereof will be omitted.

[arrangement of a main part of an imaging apparatus FIG. 1]

An arrangement of a main part of an imaging apparatus used in the single-unit video-camera recorder according to the embodiment will initially be described with reference to FIG. 1. This imaging apparatus includes a lens block 1 for optically condensing incident light at the front of the imaging apparatus, an imaging block 2 for converting the incident light from the lens block 1 into electric video signals for R (red), G (green) and B (blue), a signal processing block 3 for subjecting the video signals to a predetermined signal processing, a recording and reproducing block 4, and a system controller 5 for controlling the lens block, the imaging block, the signal processing block and the recording and reproducing block.

(lens block)

The lens block 1 is detachably provided in a main body of the single-unit video-camera recorder or the like. This lens block has as optical elements, not shown, a zooming lens which moves along an optical axis and hence can continuously change the total focal length with an imaging point kept on the same plane and which thus zooms (continuously enlarging and reducing a size of) an image of an object, a focus lens for adjusting an object to be in focus, and an iris mechanism for adjusting an amount of light incident on the front surface of an imaging device by changing a diameter of an opening (controlling an iris diaphragm).

Though also not shown similarly, the lens block 1 further includes a position detection sensor for detecting an optical-axis direction lens position of the zooming lens, a drive motor for moving the zooming lens in the optical-axis direction, a zooming lens drive circuit for supplying a drive control signal to the drive motor, a position detection sensor for detecting an optical-axis direction lens position of the focus lens, a drive motor for moving the focus lens in an optical-axis direction, a focus lens driving circuit for supplying a drive control signal to the drive motor, a position detecting sensor for detecting an opening position of the iris mechanism, a drive motor for opening and closing the iris mechanism, and an iris mechanism driving circuit for supplying a drive control signal to the drive motor.

The position detecting sensor always supplies a detection signal to the system controller 5, and the zooming lens drive circuit, the focus lens driving circuit and the iris mechanism driving circuit are electrically connected to the system controller 5 so as to be supplied with the control signal from the system controller.

(imaging block)

The imaging block 2 has a color separation prism 11 for separating the incident light from the lens block 1 into three primary color lights of R, G, B, and imaging devices 12R, 12G, 12B for respectively converting lights of R component, G component and B component, into which the color separation prism 11 separates the light and which are imaged on an image plane, into electrical video signals (R), (G), (B) to output them, respectively. For example, these imaging devices 12R, 12G, 12B are formed of CCDs (charge coupled devices).

The imaging block 2 further includes preamplifiers 13R, 13G, 13B for respectively amplifying levels of the video signals (R), (G), (B) output from the imaging devices 12R, 12G, 12B and for carrying out a correlation double sampling for them to thereby remove a reset noise.

The imaging block 2 further includes a timing signal generating circuit 15 for generating, based on a reference clock from a reference clock generator circuit provided therein, a VD signal, an HD signal and a CLK signal serving as basic clocks when each of circuits and parts in the imaging apparatus are operated, and a CCD drive circuit 14 for supplying a drive clock to the imaging devices 12R, 12G, 12B based on the VD signal, the HD signal and the CLK signal supplied from the timing signal generating circuit 15.

The VD signal is a clock signal indicative of one vertical period. The HD signal is a clock signal indicative of one horizontal period. The CLK signal is a clock signal indicative of one pixel clock. Though not shown, a timing clock formed of these VD, HD and CLK signals is supplied through the system controller 5 to the respective circuit elements of the imaging apparatus.

(signal processing block)

The signal processing block 3 is a block which is provided inside the imaging apparatus body and subjects the video signals (R), (G), (B) supplied from the imaging block 2 to a predetermined signal processing. The signal processing block 3 includes A/D converter circuits 21R, 21G, 21B for respectively converting analog video signal (R), (G), (B) into digital video signals (R), (G), (B), gain control circuits 22R, 22G, 22B for respectively controlling gains of the digital video signals (R), (G), (B), signal processing circuits 23R, 23G, 23B for respectively subjecting the digital video signals (R), (G), (B) to a predetermined signal processing, a matrix encoder 24 for generating a luminance signal Y and color difference signals (R-Y) and (B-Y) from the video signals (R), (G), (B) which are chrominance signals, and a bit rate encoder 31 for compressing data of these luminance signal Y and color difference signals (R-Y) and (B-Y).

Each of the gain circuits 22R, 22G, 22B has, though not shown, a plurality of amplifiers having different gains and a gain switching circuit for selectively switching outputs from these amplifiers, to thereby selectively amplify the chrominance signals (R), (G), (B) for red, green and blue. Specifically, though not shown, each of the gain control circuits 22R, 22G, 22B has a plurality of amplifiers having different gains of +0[dB], +6[dB], +9[dB], +12[dB], +18[dB], +24[dB], +30[dB], wherein each of the outputs from the amplifiers is input to the gain switching circuit which selectively outputs the amplified results from the amplifiers having different gains in response to the gain switch signal output from the system controller 5. Thus, the single-unit video-camera recorder is arranged so that a cameraman can increase the gain of the image pickup result if necessary.

The signal processing circuits 23R, 23G, 23B respectively have, for example, knee circuits 231R, 231G, 231B for compressing video signals having a certain level or greater (subjecting the video signals to white compression), γ correction circuits 232R, 232G, 232B for correcting the levels of the video signals in accordance with a preset γ curve (nonlinear characteristics), and B/W clip circuits 233R, 233G, 233B for clipping a black level smaller than a predetermined level and a white level larger than a predetermined level.

Other than the knee circuit, the γ correction circuit, the B/W clip circuit, each of the signal processing circuits 23R, 23G, 23B may have, though not shown, a known black γ correction circuit, a known contour emphasizing circuit, a known linear matrix circuit and so on.

The signal processing block 3 further has an iris control circuit 25 for receiving the video signals (R), (G), (B) respectively output from the signal processing circuits 23R, 23G, 23B and controlling the iris based on the levels of the video signals so that an amount of light incident on the imaging devices 12R, 12G, 12B should be proper, and a white balance control circuit 26 for receiving the video signals (R), (G), (B) respectively output from the signal processing circuits 23R, 23G, 23B and for carrying out the white balance control based on the levels of the video signals.

The iris control circuit 25 has an NAM circuit for selecting a signal having the largest signal level from the supplied video signals (R), (G), (B), and a circuit for dividing a picture corresponding to the selected video signal into areas and integrating the video signals corresponding to all the areas. The iris control circuit 25 judges all illumination conditions of an object such as a front illumination, a back illumination, a flat illumination, a spot illumination or the like based on the integrated data of every area to thereby generate an iris control signal used for controlling the iris, and then supplies the iris control signal to the system controller 5. The system controller 5 supplies a control signal to an iris drive circuit (not shown) of the lens block 1 based on this iris control signal.

The white balance control circuit 26 generates a white balance control signal from the supplied video signals (R), (G), (B) so that (R-Y)=0 and (B-Y)=0 should be satisfied, and then supplies the white control signal to the system controller 5. The system controller 5 supplies the gain switching signal to the gain control circuits 22R, 22G, 22b based on the white balance control signal.

The signal processing block 2 further includes the matrix encoder 24 for receiving the video signals (R), (G), (B) respectively output from the signal processing circuits 23R, 23G, 23B to generate the luminance signal (Y) and the color difference signals (R-Y), (B-Y) from the video signals (R), (G), (B).

The bit rate encoder 31 at the succeeding stage of the matrix encoder 24 compresses the data. This video compression technique will be described with reference to FIG. 2 later on.

(recording and reproducing block)

The recording and reproducing block has a recording/reproducing unit 33. The recording/reproducing unit 33 is a video tape recorder in a case of the single-unit video-camera recorder as described in this embodiment. In other imaging apparatus, the recording/reproducing unit may be a magneto-optical disk drive device, a fixed disk device or the like.

Figure 2:
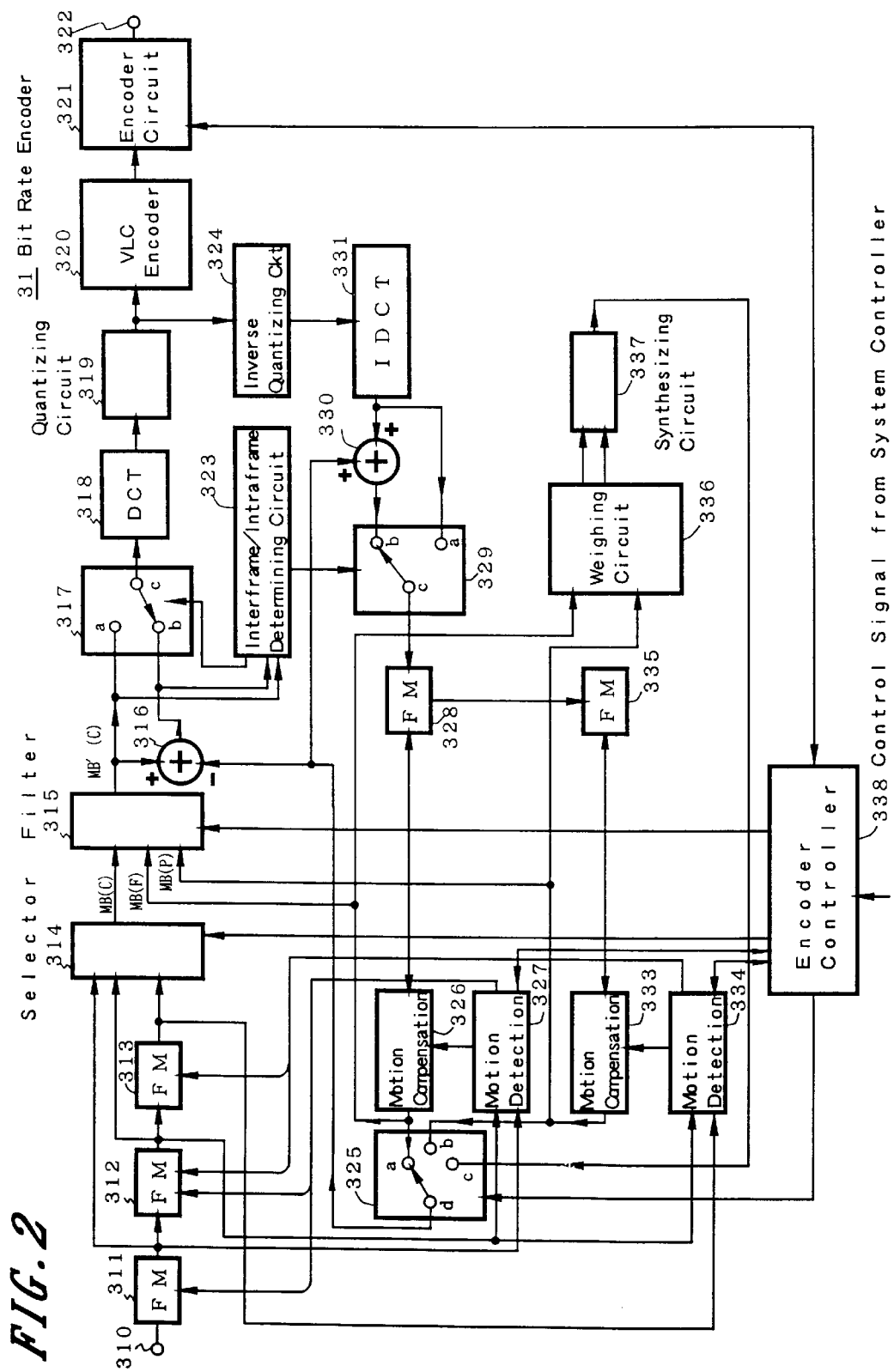
FIG. 2 is a diagram showing an arrangement of a bit rate encoder shown in FIG. 1.

[bit rate encoder FIGS. 2 and 3]

(arrangement)

FIG. 2 is a diagram showing details of the bit rate encoder 31 shown in FIG. 1. The bit rate encoder 31 includes frame memories (FM) 311, 312, 313, a selector 314, a filter circuit 315, a motion detecting block, a motion compensation block, an adder circuit 316, an interframe/intraframe determining circuit 323, a switch 317, a compression coding block, and an encoder controller 338.

In this arrangement, the motion detecting block has a motion detecting circuit 327 and a motion detecting circuit 334.

The motion compensation block has an inverse quantizing circuit 324, an IDCT (Inverse Discrete Cosine Transform) circuit 331, an adder circuit 330, a switch 329, frame memories 328 and 335, motion compensation circuits 326 and 333, a weighing circuit 336, a synthesizing circuit 337, and a switch 325.

The compression encoding block has a DCT (Discrete Cosine Transform) circuit 318, a quantizing circuit 319, a VLC (Variable Length Code) encoder 320, and an encoder circuit 321.

The bit rate encoder 31 will be described specifically. The bit rate encoder 31 includes the frame memories 311, 312, and 313 for successively storing video data supplied thereto through an input terminal 310, the selector 314 for selecting one of the outputs from the frame memories 311, 312, 313 based on a control signal from the encoder controller 338 to output it as a video data to be encoded, the filter circuit 315 for filtering the video data to be encoded in order to reduce noises, the motion detecting block for carrying out motion detection to obtain a motion vector data, the motion compensation block for carrying out the motion compensation based on the motion vector data obtained by the motion detecting block, the adder circuit 316 for obtaining difference between a macroblock data from the filter circuit 315 having a size of 16 lines×16 pixels and a motion-compensated macroblock data from the motion compensation block having a size of 16 lines×16 pixels, the interframe/intraframe determining circuit 323 for selecting the macroblock data from the filter circuit 315 or the macroblock data from the adder circuit 316, the switch 317 for selecting the macroblock data from the filter circuit 315 or the difference data from the adder circuit 316 under the control of the interframe/intraframe determining circuit 323, the encoding block for compression-encoding the output from the switch 317, and the encoder controller 338 for controlling the respective parts described above.

(frame memory)

The video data is successively input to the frame memories through the input terminal 310. This input video data is successively stored in the frame memory 311. During the next one frame period, the video data read out from the frame memory 311 is successively stored in the frame memory 312. During the next one frame period, the video data read out from the frame memory 312 is successively stored in the frame memory 313. After passage of time of three-frame amount, the video data of the first frame, the second frame and the third frame are respectively stored in the frame memory 313, the frame memory 312, and the frame memory 311. Therefore, assuming that the output from the frame memory 312 is the video data of the current frame, the output from the frame memory 311 is the video data of a future frame because it is stored therein after the video data of the second frame and the output from the frame memory 313 is a video data of a past frame.

(selector circuit)

The selector circuit 314 selectively outputs the outputs from the frame memories 311, 312, 313 based on a control signal from the encoder controller 338. In this embodiment, for convenience in explanation, it is assumed that the frame to be encoded is the current frame stored in the frame memory 312 and the macroblocks of the current frame are successively supplied to the filter circuit 315 at the succeeding stage.

(filter circuit)

The filter circuit 315 is provided in order to reduce noises. Specifically, as described in problems of the background art, employment of the moving picture compression technique results in the fact that when the motion compensation is carried out, random noises of the video data is regarded as a motion and a large number of bits are allocated to the motion. Further, if a gain of such video data is increased, it disadvantageously increases the noise to that extent. Even in such case, the filter circuit 315 serves to reduce the random noises similar to a low-pass filter.

The filter circuit 315 employs as input data the motion-compensated past macroblock data MB(P) of the frame and the motion-compensated future macroblock data MB(F) of the frame other than the macroblock data MB(C) of the current frame. Therefore, a picture compression process of generating the macroblock data of the past and future frames will initially be described and then the filter circuit 315 will be described with reference to FIG. 5. In this embodiment, it is assumed that the filter circuit 315 is supplied with the macroblock data MB(C) of the current frame, the motion-compensated macroblock data MB(P) of the past frame and the motion-compensated macroblock data MB(F) of the future frame and the filter circuit outputs a macroblock data MB'(C) of the current frame which is filtered and from which the random noises are consequently reduced.

(compression encoding block)

The compression encoding block has the DCT circuit 318 converting the macroblock data MB'(C) from the switch 317 or the difference data of every block of 8 lines×8 pixels from coefficient data of a DC component into coefficient data of a higher AC component, the quantizing circuit 319 for quantizing the coefficient data from the DCT circuit 318 with a predetermined quantizing step, the VLC encoder 320 for variable-length-coding the coefficient data from the quantizing circuit 319 by a run-length coding method, a Huffman coding method or the like, and the encoder circuit 321 for adding the variable-length coded data from the VLC encoder 320 with inner and outer parities used for recording or transmission to convert the data into that of product code system.

The quantizing circuit 319 quantizes the coefficient data obtained from the DCT converting circuit 318 to output it. At this time, a quantizing table is changed by coding control. In the coding control of this kind, the quantizing table is changed in response to a data amount of the result of the encoding processing, thereby a data amount of each coding unit (e.g., formed of a macroblock or a slice unit) being kept having a predetermined value. Therefore, if a higher coefficient generated by the random noise is reduced in a previous proper processing or the discrete cosine transform processing, then it is possible to secure bits enough for an original video data other than noises to that extent, which can effectively avoid deterioration of the picture quality.

(motion detecting block)

The motion detecting block has the motion detecting circuit 327 for detecting motion with using the macroblock data MB(F) of the future frame from the frame memory 311 and the macroblock data MB(C) of the current frame from the frame memory 312 to obtain the motion vector data, and the motion detecting circuit 334 for detecting motion with using the macroblock data MB(P) of the past frame from the frame memory 313 and the macroblock data MB(C) of the current frame from the frame memory 312 to obtain the motion vector data.

(motion compensation block)

The motion compensation block has the inverse quantizing circuit 324 for inverse-quantizing the coefficient data from the quantizing circuit 319 to obtain the coefficient data similar to that obtained at the DCT circuit 318, the IDCT circuit 331 for converting the coefficient data from the inverse quantizing circuit 324 into an original macroblock data or a difference data, the adder circuit 330 for adding an output from the IDCT circuit 331 and the motion-compensated macroblock data, the switch 329 for supplying an output from the adder circuit 330 or an output from the IDCT circuit 331 to the frame memory 328 based on a switching control signal from the interframe/intraframe determining circuit 323, the frame memory 328 for storing an output from the switch 329 in its storage area, the frame memory 335 for successively storing the macroblock data read out from the frame memory 328, the motion compensating circuit 326 for selecting a proper macroblock data from the frame data stored in the frame memory 328 based on the motion vector data from the motion detecting circuit 327 and for outputting the selected macroblock data as the motion-compensated macroblock data, a motion compensating circuit 333 for selecting a proper macroblock from the frame data stored in the frame memory 335 based on the motion vector data from the motion detecting circuit 334 and for outputting the selected macroblock data as the motion-compensated macroblock data, the weighing circuit 336 for weighing the motion-compensated macroblock data from the motion compensation circuits 326 and 333 in response to time difference relative to the current frame, the synthesizing circuit 337 for synthesizing two macroblock data weighted by the weighing circuit 336, and the switch 325 for selectively outputting the motion-compensated macroblock data from the motion compensation circuit 326, the motion-compensated macroblock data from the motion compensation circuit 333 and the synthesized macroblock data from the synthesizing circuit 337 based on the switching control signal from the encoder controller 338.

The interframe/intraframe determining circuit 323 compares dispersion values of the macroblock data from the filter circuit 315 and the difference data from the adder circuit 316 or the like to control the switch so that the macroblock data having a smaller dispersion value should be selected.

The motion compensation circuit 326 motion-compensates a macroblock succeeding the macroblock of the current frame output from the filter circuit 315 in view of time, i.e., the macroblock data MB(F) of the future frame. The motion compensation circuit 333 motion-compensates a macroblock preceding to the macroblock of the current frame output from the filter circuit 315 in view of time, i.e., the macroblock data MB(P) of the past frame.

The weighing circuit 336 and the synthesizing circuit 337 weights and synthesizes two motion-compensated macroblock data from the motion compensation circuits 326 and 333, thereby carrying out a processing equivalent to that of motion-compensating the macroblock data MB(F), MB(P) respectively succeeding and preceding to the macroblock data of the current frame output from the filter circuit 315 to obtain the synthesized macroblock data obtained by synthesizing the two motion-compensated macroblocks.

The macroblock data MB'(C) of the current frame successively output from the filter circuit 315 is used at the adder circuit 316 for obtaining different between it and either of outputs (motion-compensated macroblock data) of the above three systems, and the difference is encoded. The difference data from the adder circuit 316 is difference between frames which is encoded. This coding is called an interframe coding (inter coding). On the other hand, the output from the selector 314 is encoded as it is and hence this coding is called as an intraframe coding (intra coding).

(I picture, B picture, P picture)

The video data of respective frames output from the selector 314 and then encoded are generally called an I picture (Intra-Picture, intraframe coded picture), a B picture (Bidirectionally predictive-picture, bidirectional predictive coded picture), and a P picture (Predictive-Picture, interframe forward predictive coded picture).

The "I picture" is an encoded video data of one frame amount formed of data obtained by intraframe-coding the macroblock data MB'(C) of the current frame output from the filter circuit 315. Definition of the coding is the encoding carried out by the DCT circuit 318, the quantizing circuit 319 and the VLC encoder 320. Therefore, when the I picture is processed, based on the control of the interframe/intraframe determining circuit 323, movable contacts c of the switches 317 and 329 are always connected to respective fixed contacts a thereof. The current frame in this embodiment means a macroblock data supplied from the selector 314 through the filter circuit 315 and encoded as it is (intraframe-coded) or the difference calculated and then encoded (interframe-coded).

The "P picture" is a video data obtained by encoding difference data between the macroblock data MB'(C) of the current frame output from the filter circuit 315 and the motion-compensated macroblock data of the I or P picture of a frame preceding to the macroblock data MB'(C) of the current frame in view of time, and an encoded video data of one frame amount formed of data obtained by intraframe-coding the macroblock data of the current frame. When the P picture is generated, the motion vector data used for motion-compensating the video data as the I picture is obtained from the video data to be encoded as a P picture and a video data just previous to the video data in view of input order.

The "B picture" is a video data obtained by encoding (interframe-coding) difference data between the macroblock data MB'(C) of the current frame output from the filter circuit 315 and the following six kinds of macroblock data.

The macroblock data of six kinds are the motion-compensated macroblock data of I or P picture of a frame preceding to the macroblock data MB'(C) of the current frame output from the filter circuit 315 in view of time, the motion-compensated macroblock data of I or P picture of a frame succeeding the macroblock data MB'(C) of the current frame output from the filter circuit 315 in view of time, an interpolated macroblock data generated from an I picture preceding to the macroblock data MB'(C) of the current frame output from the filter circuit 315 in view of time and a P picture succeeding to the macroblock data of the current frame in view of time, and an interpolated macroblock data generated from a P picture preceding to the macroblock data MB'(C) of the current frame output from the filter circuit 315 in view of time and a P picture succeeding to the macroblock data of the current frame in view of time.

As will be understood from the above description, the P picture is a data encoded by using a video data of a frame other than the current frame, i.e., includes an interframe-coded data. The B picture is formed only of an interframe-coded data and hence cannot be decoded by using only the B picture itself. Therefore, as well known, it is described that a plurality of related pictures form one GOP (Group Of Pictures) and the pictures are processed by a GOP unit.

The GOP is usually formed of one or a plurality of I pictures and no or a plurality of non-I pictures. For convenience in explanation, this embodiment will be described on the assumption that one GOP is formed one I picture, one P picture and two B pictures.

This embodiment will be described on the assumption that the B picture is obtained by calculating the difference between the video data preceding to and succeeding this B picture and that the P picture is obtained from the I picture. Practically, upon the encoding processing, a macroblock data having the highest coding efficiency is selected from compensated macroblock data obtained by compensating data by the forward motion compensation, the bidirectional motion compensation and the backward motion compensation, and, upon the decoding processing, the same compensation as that selected upon the encoding processing is carried out at the macroblock unit. Specifically, the difference data in one B picture is a data obtained by subtracting the compensated macroblock data compensated by any of the forward motion compensation, the bidirectional motion compensation and the backward motion compensation from the macroblock data to be encoded, and the difference data in one P picture is a data obtained by subtracting the compensated macroblock data compensated by either of the forward motion compensation and the backward motion compensation from the macroblock data to be encoded.

(Operation upon encoding processing)

An operation of the bit rate encode shown in FIG. 2 will be described.

The video data supplied to the input terminal 310 is successively stored in the frame memories 311, 312, 313. The motion detecting circuit 327 carries out the motion detection based on the future frame macroblock data MB(P) from the frame memory 311 and the current frame macroblock data MB(C) from the frame memory 312 and supplies the motion vector data consequently obtained to the motion compensation circuit 326. The motion detecting circuit 334 carries out the motion detection based on the past frame macroblock data MB(P) from the frame memory 313 and the current frame macroblock data MB(C) from the frame memory 312 and supplies the motion vector data consequently obtained to the motion compensation circuit 333. Thus, each of the motion detecting circuits 327 and 334 obtains the motion vector data of every macroblock.

When there are obtained all the motion vector data indicating the motion vectors between all the macroblock data MB(C) of the current frame and all the macroblock data MB(P) of the past frame and all the motion vector data indicating the motion vectors between all the macroblock data MB(C) of the current frame and all the macroblock data MB(P) of the past frame, then the encoding processing starts.

(encoding processing)

How to encode the macroblock data MB'(C) output from the filter circuit 315 will be described also with reference to FIG. 3a and FIG. 3b.

Figures 3A, 3B, 3C:
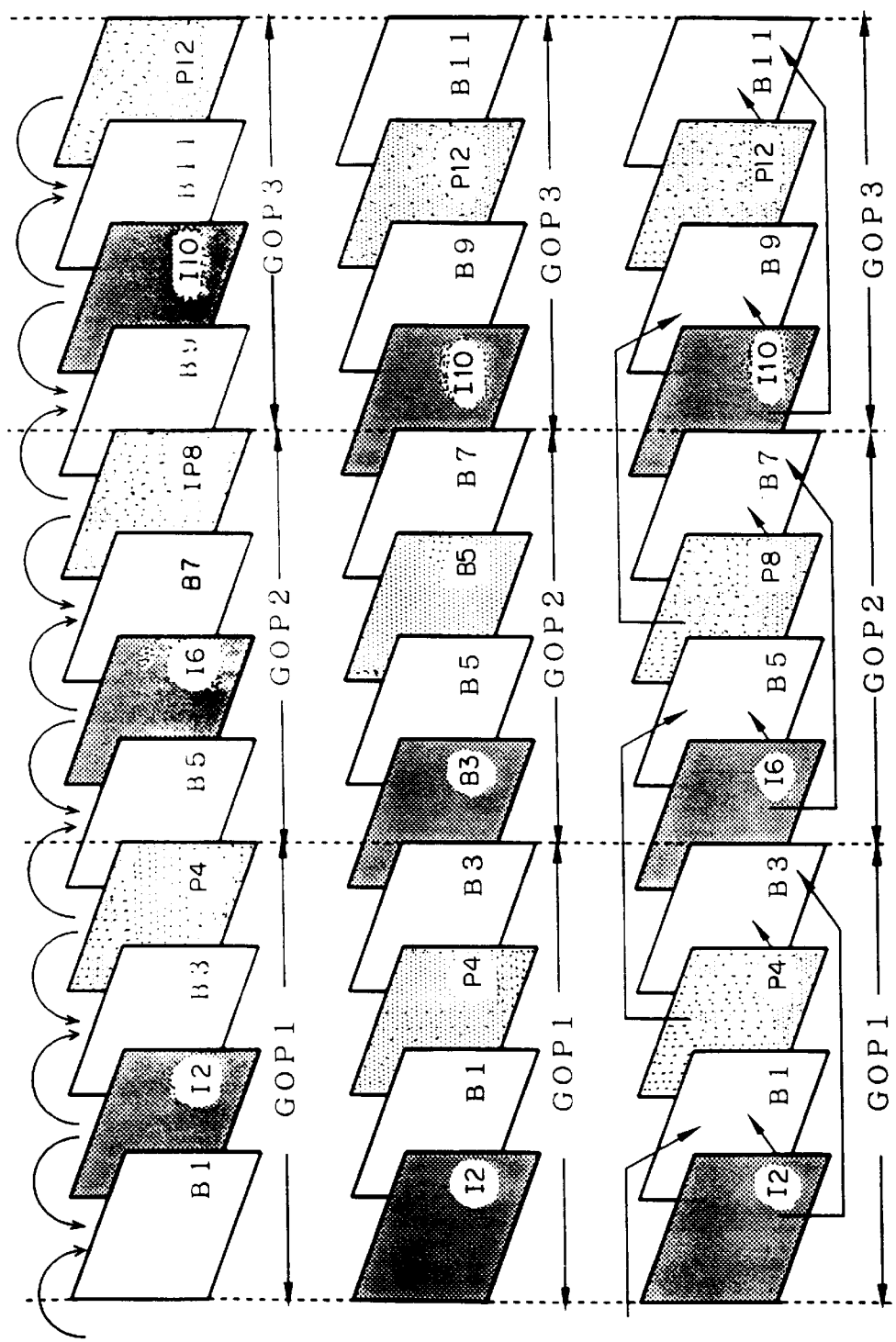
FIG. 3 is a diagram used to explain three types of pictures.

FIG. 3a shows video data of every frame supplied to the input terminal 310. FIG. 3b shows video data of every frame output from the filter circuit 315. Reference numerals of reference symbols in every frame shown in the figures depict an input order, and alphabets thereof depicts that if the alphabet is "B", the video data of the frame is encoded as the B picture, that if the alphabet is "I", the video data is encoded as the I picture and that if the alphabet is "P", the video data is encoded as the P picture.

A video data indicated by an arrow depicts a video data to be encoded, and a video data from which an arrow starts depicts a video data used when the video data to be encoded is encoded. Specifically, the arrow shown in FIG. 3a indicates of which frame the video data is used as a predictive picture when the video data of every frame indicated by an arrow is encoded. For example, a video data of a third frame which is to be encoded as a B picture is encoded by calculating difference between the video data and either of a video data of a second frame which is to be encoded as an I picture and a video data of a fourth frame which is to be encoded as a P picture or a synthesized video data obtained by synthesizing the two video data. The P picture is not indicated by an arrow indicating a frame which is used as a predictive picture therefor.

The encoding processing will be described by exemplifying the frames in a GOP 2 shown in FIGS. 3a and 3b, on the assumption that a video data P4 used as a predictive picture for a video data B5 shown in FIG. 3a is stored in the frame memory 335 shown in FIG. 2 and further, for convenience in explanation, when the B picture is obtained through the encoding processing, a predictive picture data from the synthesizing circuit 337 is always used.

A video data to be initially encoded is a video data I6. As shown in FIG. 3b, all macroblock data of the video data I6 are successively output as the current macroblock data MB(c) from the selector 314 (through the filter circuit 315). At this time, the respective movable contacts c of the switches 317 and 329 are connected to the fixed contacts a for the intraframe video data. Therefore, the macroblock data of the video data I6 is supplied through the switch 317, then successively processed by the DCT circuit 318, the quantizing circuit 319, the VLC encoder 320 and the encoder circuit 321, and thereafter output through an output terminal 322.

Coefficient data of the video data I6 quantized by the quantizing circuit 319 is restored by the inverse quantizing circuit 324 and the IDCT circuit 331 to the original macroblock data having a size of 8 lines×8 pixels, and then the original macroblock data is supplied through the switch 329 to the frame memory 328 and successively stored in the frame memory 328.

Then, the video data P4 is stored in the frame memory 335, and the video data I6 is stored in the frame memory 328. At a stage before the picture data B5 is output from the selector 314, the video data I6 is stored as the future frame in the frame memory 311, the video data B5 is stored as the current frame in the frame memory 312, and the video data P4 is stored as the past frame in the frame memory 313.

At this time, the motion detecting circuit 327 carries out the motion detection by using each of the macroblocks of the video data B5 stored in the frame memory 312 and each of the macroblocks of the video data I6 stored in the frame memory 311, thereby obtaining the motion vector data indicating which part (macroblock data) of the video data I6 each of the macroblocks of the video data B5 is agreed with. The motion compensation circuit 326 employs the motion vector data of every macroblock to successively read out the corresponding macroblock data of the video data I6 stored in the frame memory 328, i.e., to carry out the motion compensation.

The motion detecting circuit 334 carries out the motion detection by using each of the macroblocks of the video data B5 stored in the frame memory 312 and each of the macroblocks of the video data P4 stored in the frame memory 313, thereby obtaining the motion vector data indicating which part (macroblock data) of the video data P4 each of the macroblocks of the video data B5 is agreed with. The motion compensation circuit 333 employs the motion vector data of every macroblock to successively read out the corresponding macroblock data of the video data P4 stored in the frame memory 328, i.e., to carry out the motion compensation.

The video data B5 output as the current macroblock data MB(C) from the selector 314 is supplied to the filter circuit 315. At this time, the filter circuit 315 is supplied with the video data I6 motion-compensated by the motion compensation circuit 326 as the motion-compensated future macroblock data MB(F) and with the video data P4 motion-compensated by the motion compensation circuit 333 as the motion-compensated past macroblock data MB(P). The filter circuit 315 filters the current macroblock data MB(C) based on the motion-compensated future macroblock data MB(F) and the motion-compensated past macroblock data MB(P), thereby reducing the random noises of the current macroblock data MB(C). Arrangement and operation of the filter circuit 315 will be described in detail later on.

When the filter circuit 315 outputs the filtered macroblock data MB'(C) of the video data B5, the synthesizing circuit 337 outputs the synthesized macroblock data obtained from the motion-compensated macroblock data MB(F) of the video data I6 from the motion compensation circuit 326 and the motion-compensated macroblock data MB(P) of the video data P4 from the motion compensation circuit 333, supplying the synthesized macroblock data through the switch 325 to the adder circuit 316. Therefore, the adder circuit 316 subtracts the synthesized macroblock data from the macroblock data of the video data B5. The difference data obtained by this subtraction is encoded by the respective circuits at the succeeding stage. The above processing is effected on all the macroblock data of the video data B5.

A video data to be encoded next is the video data P8. At a stage before the video data P8 is output from the selector 314, the video data P8 is stored in the frame memory 311, the video data B7 is stored in the frame memory 312, and the video data I6 is stored in the frame memory 313.

In this case, the motion detecting circuit 327 carries out the motion detection by using each of the macroblocks of the video data B7 stored in the frame memory 312 and each of the macroblocks of the video data P8 stored in the frame memory 311, thereby obtaining the motion vector data indicating which part (macroblock data) of the video data P8 each of the macroblocks of the video data B7 is agreed with. The motion compensation circuit 326 employs the motion vector data of every macroblock to successively read out the corresponding macroblock data of the video data I6 stored in the frame memory 328, i.e., to carry out the motion compensation. It is noticeable in this case to compensate the macroblock data of the video data I6 based on the motion vector data obtained from the video data P8 and B7.

The video data P8 output as the current macroblock data MD(C) from the selector 314 is supplied to the filter circuit 315. At this time, the filter circuit 315 is supplied with the video data I6 motion-compensated by the motion compensation circuit 326 as the motion-compensated future macroblock data MB(F). The filter circuit 315 filters the current macroblock data MB(C) based on the motion-compensated future macroblock data MB(F), thereby reducing the random noises of the current macroblock data MB(C).

When the filter circuit 315 outputs the filtered macroblock data MB'(C) of the video data P8, the motion compensation circuit 326 supplies the motion-compensated macroblock data of the video data I6 through the switch 325 to the adder circuit 316. Therefore, the adder circuit 316 subtracts the motion-compensated macroblock data of the video data I6 from the macroblock data of the video data P8. The difference data obtained by this subtraction is encoded by the respective circuits at the succeeding stage and output through the output terminal 322. The above processing is effected on all the macroblock data of the video data B5. After the video data P8 is encoded, the video data I6 stored in the frame memory 328 is stored in the frame memory 335.

During the above processing, the encoded difference data from the quantizing circuit 319 is returned to an original difference data by the inverse quantizing circuit 324 and the IDCT circuit 331, and then supplied to the adder circuit 330. THe adder circuit 330 adds the encoded difference data with the motion-compensated macroblock data supplied from the motion compensation circuit 326 through the switch 325. Thus, the encoded difference data is converted into the macroblock data of the video data P8. THe macroblock data of the video data P8 is supplied through the switch 329 to the frame memory 328. The above processings are carried out until a processing of storing the video data P8 in the frame memory 328 is finished.

A video data to be encoded next is the video data B7. At a stage before the video data B7 is output from the selector 314, the video data P8 is stored as the future frame in the frame memory 311, the video data B7 is stored as the current frame in the frame memory 312, and the video data I6 is stored as the past frame in the frame memory 313.

Then, the motion detecting circuit 327 carries out the motion detection by using each of the macroblocks of the video data B7 stored in the frame memory 312 and each of the macroblocks of the video data P8 stored in the frame memory 311, thereby obtaining the motion vector data indicating which part (macroblock data) of the video data P8 each of the macroblocks of the video data B7 is agreed with. The motion compensation circuit 326 employs the motion vector data of every macroblock to successively read out the corresponding macroblock data of the video data P8 stored in the frame memory 328, i.e., to carry out the motion compensation.

The motion detecting circuit 334 carries out the motion detection by using each of the macroblocks of the video data B7 stored in the frame memory 312 and each of the macroblocks of the video data I6 stored in the frame memory 313, thereby obtaining the motion vector data indicating which part (macroblock data) of the video data I6 each of the macroblocks of the video data B7 is agreed with. The motion compensation circuit 333 employs the motion vector data of every macroblock to successively read out the corresponding macroblock data of the video data I6 stored in the frame memory 335, i.e., to carry out the motion compensation.

The video data B7 output as the current macroblock data MD(C) from the selector 314 is supplied to the filter circuit 315. At this time, the filter circuit 315 is supplied with the video data P8 motion-compensated by the motion compensation circuit 326 as the motion-compensated future macroblock data MB(F) and with the video data I6 motion-compensated by the motion compensation circuit 333 as the motion-compensated future macroblock data MB(P). The filter circuit 315 filters the current macroblock data MD(C) based on the motion-compensated future macroblock data MB(F) and the motion-compensated past macroblock data MB(P), thereby reducing the random noises of the current macroblock data MD(C).

When the filter circuit 315 outputs the filtered macroblock data MB'(C) of the video data B7, the synthesizing circuit 337 outputs the synthesized macroblock data obtained from the motion-compensated macroblock data MB(F) of the video data P8 from the motion compensation circuit 326 and the motion-compensated macroblock data MB(P) of the video data I6 from the motion compensation circuit 333, supplying the synthesized macroblock data through the switch 325 to the adder circuit 316. Therefore, the adder circuit 316 subtracts the synthesized macroblock data from the macroblock data of the video data B7. The difference data obtained by this subtraction is encoded by the respective circuits at the succeeding stage and then output through the output terminal 322. The above processing is effected on all the macroblock data of the video data B7. After the video data B7 is encoded, the video data P8 stored in the frame memory 328 is stored in the frame memory 335.

As described above, the video data of the respective frames in the GOP2 are encoded. Video data in other GOPs are similarly encoded. The encoder controller 338 adds a compression difference data supplied to the encoder circuit 321 with the motion vector data from the motion detecting circuits 327 and 334, the data indicating type of the motion compensation (or data indicating data used for subtraction upon the encoding processing) or the like, and data indicative of type of a picture, and further adds data indicative of a head of the GOP with the compression difference data of every GOP and adds data indicative of the coding order with the compression difference data. The compression difference data added with the above data are converted by the encoder circuit 321 into the data of product code as described above and then output through the output terminal 322 for the recording or transmission.

Figure 4:
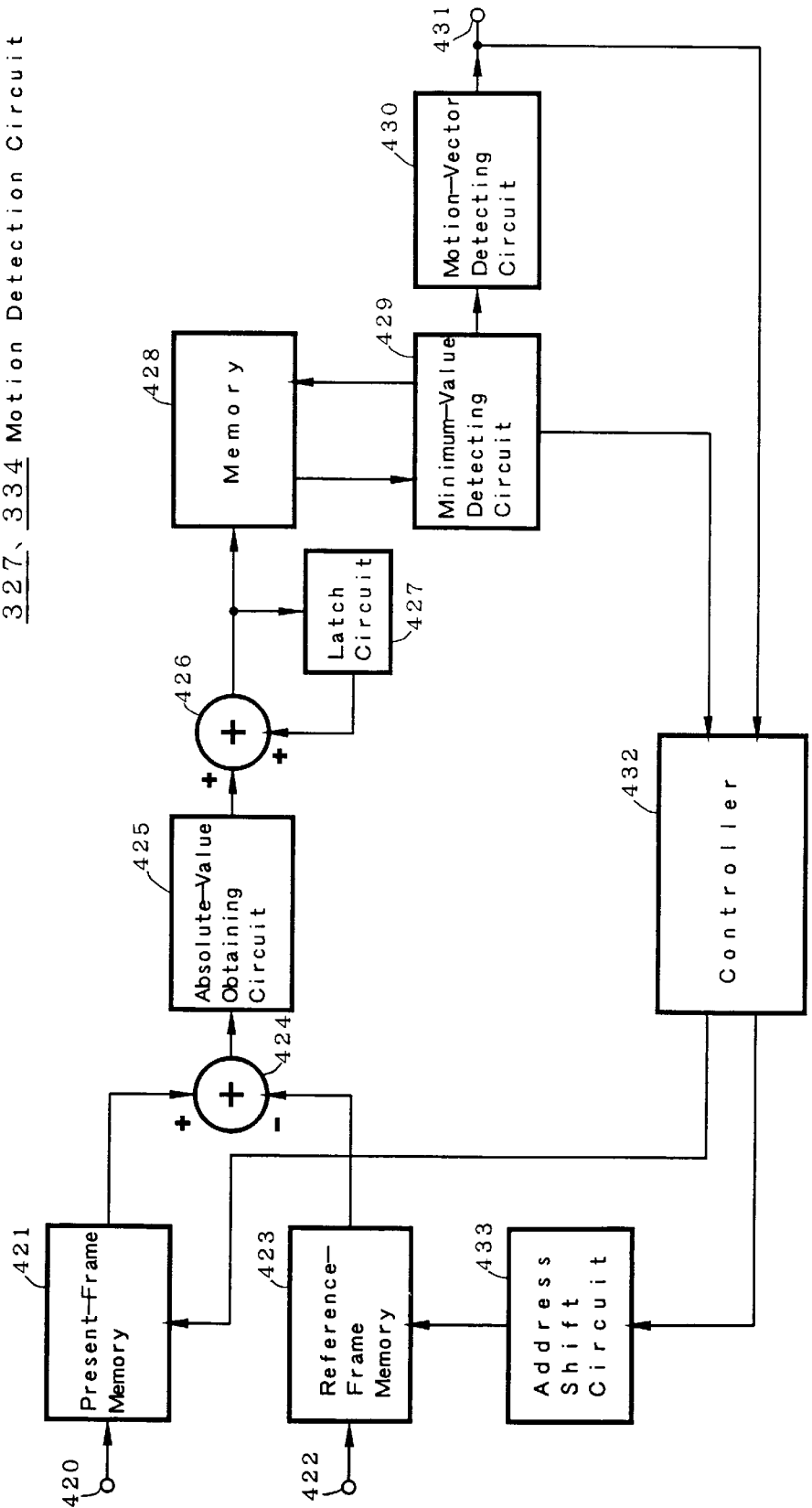
FIG. 4 is a diagram showing a motion detecting circuit shown in FIG. 2 in detail.

[example of motion detecting circuit FIG. 4]

An example of the motion detecting circuits 327 and 334 shown in FIG. 2 will be described with reference to FIG. 4. The motion detection circuit shown in FIG. 4 carries out the motion detection in accordance with a method called a block matching. The frame memory 312 shown in FIG. 2 corresponds to a present-frame memory 421 shown in FIG. 4, and the frame memories 311, 313 correspond to a reference-frame memory 423.

(connection and arrangement of motion detection circuit)

The motion detecting circuit shown in FIG. 4 has the present-frame memory 421, the reference-frame memory 423, an address shift circuit 433, an adder circuit 424, an absolute-value obtaining circuit 425, a latch circuit 427, an adder circuit 426, a memory 428, a minimum-value detecting circuit 429, a vector detecting circuit 430, and a controller 432.

Specifically, the motion detecting circuit has the present-frame memory 421 for storing the video data of the current frame, the reference-frame memory 423 for storing the video data of the future or past frame (reference frame), the address shift circuit 433 for successively supplying different address data to the reference frame memory 423, the adder circuit 424 for subtracting pixel data of the reference macroblock supplied from the reference-frame memory 423 from pixel data of a target macroblock of the current frame supplied from the present-frame memory 421, the absolute-value obtaining circuit 425 for obtaining an absolute value of difference which is a result of subtraction carried out by the adder circuit 424, the latch circuit 427 for holding an absolute-value data from the absolute-value obtaining circuit 425, the adder circuit 426 for adding an output from the absolute-value obtaining circuit 425 and a latched output from the latch circuit 427 to obtain a difference absolute-value sum data of every reference macroblock, the memory 428 for storing the difference absolute-value sum data from the adder circuit 426, the minimum-value detecting circuit 429 for detecting a minimum value of the difference absolute-value sum data stored in the memory 428, the vector detecting circuit 430 for obtaining one motion vector data corresponding to one target macroblock based on the minimum difference absolute-value sum data from the minimum-value detecting circuit 429 to supply the motion vector data to the controller 432 and the encoder controller 338 shown in FIG. 2, and the controller 432 for controlling the address shift circuit 433 based on the minimum difference absolute-value sum data from the minimum-value detecting circuit 429 and the motion vector data from the motion vector detecting circuit 330 and for controlling operations of writing the video data in the present-frame memory 421 and of reading the video data stored therein therefrom.

The motion vector detecting circuit 430 converts the input difference absolute-value sum data into the motion vector data by reading the motion vector data corresponding to the input difference absolute-value sum data, e.g., a vertical and horizontal-direction movement amount data from a ROM or the like.

(operation of motion detecting circuit)

Under the control of the controller 432, the pixel data of the macroblock (8×8 pixels, or 16×16 pixels) as the target macroblock is successively and repeatedly read from the present-frame memory 421. Under the control of the controller 432, the address shift circuit 433 sets a search area in a storage space of the reference-frame memory 423, further sets a reference block having the same size as that of the macroblock in the search area, sets a reference block having the same size as that of the macroblock in the reference block, and successively supplies address data used for successively reading pixel data in the reference block to the reference-frame memory 423. When all the pixel data in the set reference block are read out, the address shift circuit 433 shifts a position of the reference block in the search area by one pixel amount by supplying the address data to the reference-frame memory 423 and then successively supplies the address data to the reference-frame memory 423 to thereby read the pixel data in the reference block which is shifted by one pixel amount.

The adder circuit 424 subtracts the pixel data in the reference block read our from the reference-frame memory 423 from the pixel data in the target block read out from the present-frame memory 421. The adder supplies the result of this subtraction to the absolute-value obtaining circuit 425 which converts the result into the absolute-value data and supplies the absolute-value data through the adder circuit 426 to the latch circuit 427. The latch circuit 427 successively holds the addition result from the adder circuit 426, i.e., the difference absolute-value sum data, thereby the memory 428 successively storing the difference absolute-value sum data obtained from the target block in the present-frame memory 421 and the reference block in the reference-frame memory 423. Finally, the memory 428 stores the difference absolute-value sum data which is as much as a large number of the target blocks set by respectively shifting the position in the search area by one pixel amount.

When calculation of the pixel data of one target macroblock and the pixel data of a plurality of macroblocks in one search area is all finished, the minimum-value detecting circuit 429 selects the difference absolute-value sum data having the smallest value from all the difference absolute-value sum data in the memory 428 to supply the selected difference absolute-value sum data to the motion vector detecting circuit 430, and supplies a control signal used for starting the processing of the next target macroblock to the controller 432.

The difference absolute-value sum data from the minimum-value detecting circuit 429 is supplied to the motion vector detecting circuit 430. The motion vector detecting circuit 430 obtains the motion vector data corresponding to the difference absolute-value sum data from the minimum-value detecting circuit 429. The motion vector detecting circuit 430 supplies the motion vector data obtained thereby through an output terminal 431 to the motion compensation circuits 326, 333 and the encoder controller 338 shown in FIG. 2. The encoder controller 338, similarly to the above processing, after setting the search area, controls the address shift circuit 433 and the present-frame memory 421 in order to set the search area and to carry out an arithmetic processing with the pixel data in the next target macroblock and the pixel data in the reference block.

A technique concerning this block matching is disclosed in U.S. Pat. No. 4,897,720 and hence please see the U.S. Patent about more detail.

Referring to FIG. 2 again, the data subjected to high-efficiency coding by the bit rate encoder is stored in a recording medium provided in the recording/reproducing unit 33. The recording apparatus is a video tape recorder in case of the single-unit video-camera recorder described in this embodiment. The recording apparatus may be, for example, a magneto-optical disk drive device, a fixed disk device or the like in case of other imaging apparatus.

Further, the picture-compressed data thus stored is decoded by some proper decoder.

Figure 5:
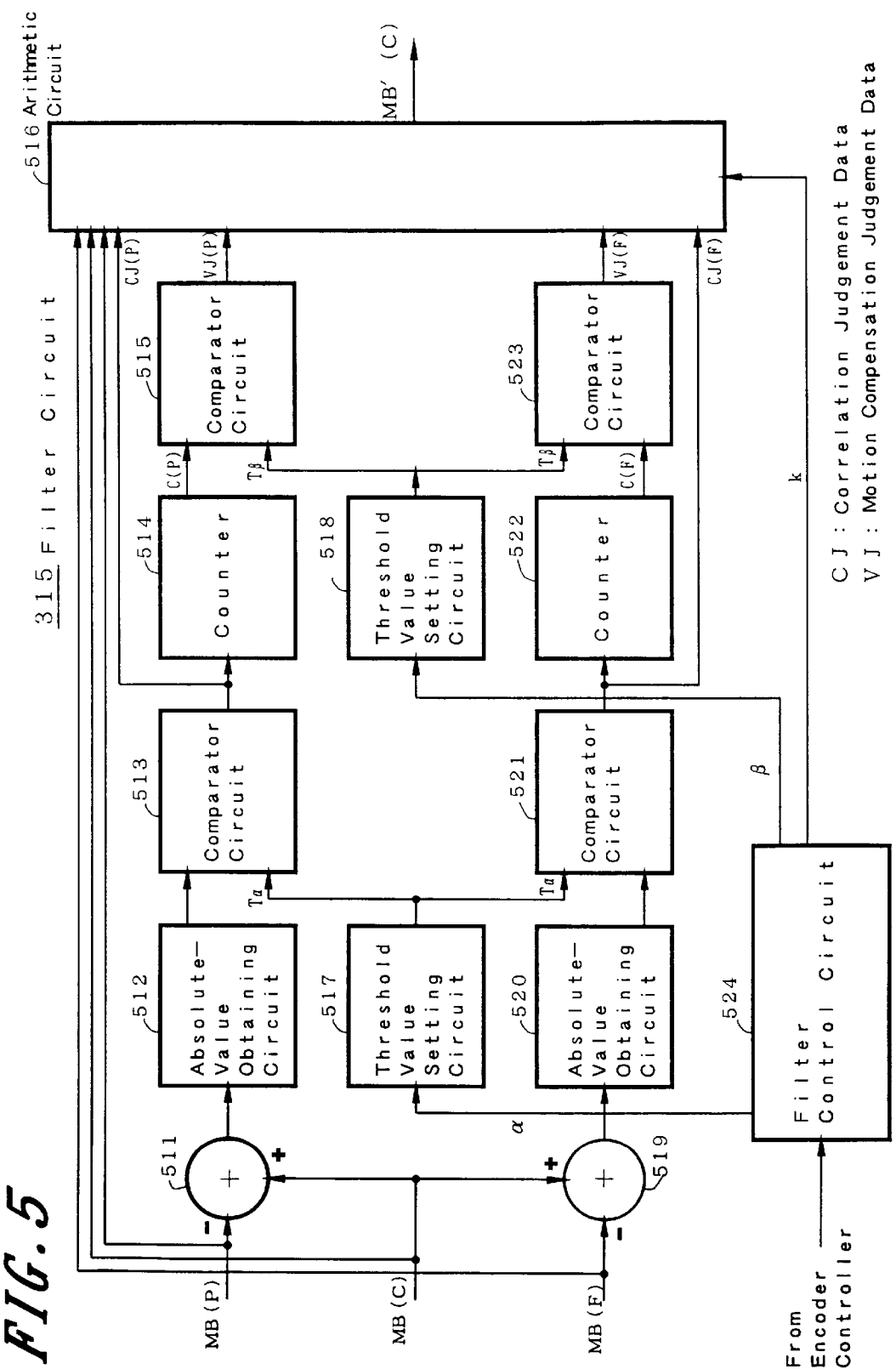
FIG. 5 is a diagram showing a filter circuit shown in FIG. 2 in detail.

[filter circuit FIG. 5]

FIG. 5 is a diagram showing a total arrangement of the filter circuit 315 shown in FIG. 2. As shown in FIG. 5, the filter circuit has adder circuits 511 and 519, absolute-value obtaining circuits 512 and 520, threshold-value setting circuits 517 and 518, comparator circuits 513 and 521, counters 514 and 522, comparator circuits 515 and 523, an arithmetic circuit 516, and a filter control circuit 524.

The filter control circuit 524 is supplied with the filter control signal from the system controller 5 through the encoder controller 338. The filter control signal is a signal corresponding to the gain control signal which the system controller 5 supplies to the gain control circuits 22R, 22G, 22B. Based on the filter control signal supplied from the system controller, the filter control circuit 524 generates a threshold coefficient α supplied to the threshold setting circuit 517, the threshold coefficient β supplied to a threshold setting circuit 518 and a filter coefficient k supplied to the arithmetic circuit 516. The threshold coefficient α and the threshold coefficient k are interlinked with the gain level indicated by the gain control signal.

The adder circuit 511 subtracts from the macroblock data MB(C) of the current frame input from the selector circuit (whose reference numeral is 314 shown in FIG. 2) the motion-compensated macroblock data MB(P) of the past frame corresponding thereto, and outputs the difference data as the subtraction result to the absolute-value obtaining circuit 512. On the other hand, the adder 519 subtracts from the macroblock data MB(C) of the current frame input from the selector circuit (whose reference numeral is 314 shown in FIG. 2) the motion-compensated macroblock data MB(F) of the future frame corresponding thereto, and outputs the difference data as the subtraction result to the absolute-value obtaining circuit 520.

The absolute-value obtaining circuit 512 calculates an absolute value of the difference data input from the adder circuit 511, and outputs the absolute value as the difference absolute-value data to one input of the comparator circuit 513. Similarly, the absolute-value obtaining circuit 520 calculates an absolute value of the difference data input from the adder circuit 519, and outputs the absolute value as the difference absolute-value data to one input of the comparator circuit 521.

The threshold setting circuit 517 is a circuit for generating a threshold value supplied to the comparator circuit 513 and the comparator circuit 521. The threshold setting circuit 517 generates a threshold value Tα based on the threshold coefficient α supplied from the filter control circuit 524, and supplies the generated threshold value Yα to the other inputs of the comparator circuit 513 and the comparator circuit 521.

The comparator circuit 513 is a circuit for determining whether or not there is correlation between the current macroblock data MB(C) and the motion-compensated past macroblock data MB(P). Specifically, the comparator circuit compares the difference absolute-value data supplied from the absolute-value obtaining circuit 512 and the threshold value Tα supplied from the threshold setting circuit 517, supplying a correlation judgement data CJ(P) to the counter circuit 514 and the arithmetic circuit 516 in response to the compared result. If the difference absolute-value data is smaller than the threshold value Tα, the comparator circuit 513 determines that there is correlation between the current macroblock data MB(C) and the motion-compensated past macroblock data MB(P), and outputs a theoretical value "1" as the correlation judgement data CJ(P). On the other hand, if the difference absolute-value data is larger than the threshold value Tα, the comparator circuit 513 determines that there is no correlation between the current macroblock data MB(C) and the motion-compensated past macroblock data MB(P), and outputs a theoretical value "0" as the correlation judgement data CJ(P).

Similarly, the comparator circuit 521 is a circuit for determining whether or not there is correlation between the current macroblock data MB(C) and the motion-compensated future macroblock data MB(F). Specifically, the comparator circuit compares the difference absolute-value data supplied from the absolute-value obtaining circuit 520 and the threshold value Tα supplied from the threshold setting circuit 517, supplying a correlation judgement data CJ(F) to the counter circuit 522 and the arithmetic circuit 516 in response to the compared result. If the difference absolute-value data is smaller than the threshold value Tα, the comparator circuit 521 determines that there is correlation between the current macroblock data MB(C) and the motion-compensated future macroblock data MB(F), and outputs a theoretical value "1" as the correlation judgement data CJ(F). On the other hand, if the difference absolute-value data is larger than the threshold value Tα, the comparator circuit 521 determines that there is no correlation between the current macroblock data MB(C) and the motion-compensated future macroblock data MB(F), and outputs a theoretical value "0" as the correlation judgement data CJ(F).

The threshold value Tα set by the threshold setting circuit 517 is a value set based on the threshold coefficient a supplied from the filter control circuit 524. The threshold value Tα is related with the gain levels of the gain control circuits 22R, 22G, 22B changed based on the gain control signal from the system controller 5, being changed so as to be in proportion to the gain levels. For example, it is assumed that the threshold value Tα is a fixed value and it is assumed for convenience in explanation that there is correlation between the current macroblock data MD(C) and the motion-compensated past macroblock data MB(P). Since, if the gain is 0 dB, there is correlation between the current macroblock data MD(C) and the motion-compensated past macroblock data MB(P), the difference data which is an output from the absolute-value obtaining circuit 512 becomes smaller than the given threshold value Tα and the comparator circuit outputs the value "1" as the correlation judgement data CJ(P). In this state, if the gain is increased from 0 dB to 9 dB, then the difference data between the current macroblock data MD(C) and the motion-compensated past macroblock data MB(P) becomes larger because of increase of the gain and the difference data sometimes becomes larger than the threshold value Tα. If the increase of the gain leads to different judgement of correlation between the current macroblock data MD(C) and the motion-compensated past macroblock data MB(P) as described above, then it is problematic.

Accordingly, in this embodiment, the threshold setting circuit 517 generates the threshold value Tα having the level proportional to the gain levels of the control circuits 22R, 22G, 22B based on the filter control signal from the system controller 5. Specifically, when the system controller 5 supplies the gain control signal to thereby increase the gain levels of the gain control circuits 22R, 22G, 22B from 0 dB to 9 dB, the filter control circuit 524 receives the filter control signal indicative of increase of the gain from the system controller 5, and supplies the threshold coefficient a to the threshold setting circuit 517. The threshold setting circuit 517 changes the level of the threshold value Tα from 0 dB to 9 dB based on the threshold coefficient α. With this processing, even if the gains of the gain control circuit 22R, 22G, 22B are changed, the result of the correlation judgement data CJ(P) is prevented from being changed.

The counter circuit 514 counts the number of pixels of the macroblock data of the current frame allowing the correlation judgement data CJ(P) of the comparator circuit 513 to have the theoretical value 1 with respect to every macroblock, and outputs a count value C(P) to the comparator circuit 515. Specifically, the counter circuit counts how many macroblocks satisfy the correlation. Similarly, the counter circuit 522 counts the number of pixels of the macroblock data of the current frame allowing the correlation judgement data CJ(F) of the comparator circuit 521 to have the theoretical value 1 with respect to every macroblock, and outputs a count value C(F) to the comparator circuit 523.

The comparator circuit 515 is a circuit for determining whether or not the motion compensation circuit 333 properly motion-compensated the past macroblock data MB(P). The comparator circuit compares a coefficient value C(P) supplied from the counter 514 and the threshold value Tβ supplied from the threshold setting circuit 518 with respect to every macroblock, supplying a motion-compensation judgement data VJ(P) to the arithmetic circuit 516 in response to the compared result. If the coefficient value C(P) is larger than the threshold value Tβ, then the comparator circuit 515 determines that the motion-compensated past macroblock data MB(P) has been properly motion-compensated, outputting a theoretical value "1" as the motion compensation judgement data VJ(P). On the other hand, if the coefficient value C(P) is smaller than the threshold value Tβ, then the comparator circuit 523 determines that the motion-compensated past macroblock data MB(P) has not been properly motion-compensated, outputting a theoretical value "0" as the motion compensation judgement data VJ(P).

Similarly, the comparator circuit 523 is a circuit for determining whether or not the motion compensation circuit 326 properly motion-compensated the future macroblock data MB(F). The comparator circuit compares a coefficient value C(F) supplied from the counter 522 and a threshold value Tβ supplied from the threshold setting circuit 518 with respect to every macroblock, supplying a motion-compensation judgement data VJ(F) to the arithmetic circuit 516 in response to the compared result. If the coefficient value C(F) is larger than the threshold value Tβ, then the comparator circuit 523 determines that the motion-compensated past macroblock data MB(P) has been properly motion-compensated, outputting a theoretical value "1" as the motion compensation judgement data VJ(F). On the other hand, if the coefficient value C(F) is smaller than the threshold value Tβ, then the comparator circuit 523 determines that the motion-compensated future macroblock data MB(F) has not been properly motion-compensated, outputting a theoretical value "0" as the motion compensation judgement data VJ(F).

The threshold setting circuit 518 generates the threshold value Tβ based on the threshold coefficient supplied from the filter control circuit 524. The threshold value Tβ is different from the threshold value Tα generated by the threshold setting circuit 517 in that it is not related with the gain levels of the gain control circuits 22R, 22G, 22B. Therefore, the threshold value Tβ may be a fixed value, but it is more preferable that the value is changed in response to degrees of the motion-compensating processing carried out by the motion compensation circuits 326 and 333.

The arithmetic circuit 516 is input with the correlation judgement data CJ(P) and CJ(F), the motion-compensation judgement data VJ(P) and VJ(F), the macroblock data MB(C) of the current frame, the motion-compensated macroblock data MB(P) of the past frame, the motion-compensated macroblock data MB(F) of the future frame, and the filter coefficient k from the filter control circuit 524. The arithmetic circuit 516 filters the macroblock data MB(C) of the current frame by using either or both of the macroblock data MB(P) of the past frame and the macroblock data MB(F) of the future frame, and outputs the filtered data as a filtered data MB'(C).

At the first step, the arithmetic circuit 516 calculates a weighted mean MB"(C) based on equation (1)

$$MB''(C) = \{P \cdot MB(P) + C \cdot MB(C) + F \cdot MB(F)\}/4 \quad (1)$$

where MB(C), MB(P) and MB(F) are respectively the pixel data of the past macroblock data MB(P), the current macroblock data MD(C) and the future macroblock MB(F) and where "P", "C" and "F" are weighted coefficients for MB(P), MB(C) and MB(F), respectively. These weighted coefficients are selected based on the correlation judgement data and the motion compensation judgement data supplied to the arithmetic circuit 516. Specifically, as shown in Table 1, the weighted coefficients "P", "C" and "F" are set.

TABLE I

| VJ(P) | VJ(F) | CJ(P) | CJ(F) | MB(P) P | MB(C) C | MB(F) F |
|---|---|---|---|---|---|---|
| 1 | 1 | 1 | 1 | 1 | 2 | 1 |
| 1 | x | 1 | 0 | 2 | 2 | 0 |
| 1 | 0 | 1 | x | 2 | 2 | 0 |
| x | 1 | 0 | 1 | 0 | 2 | 2 |
| 0 | 1 | x | 1 | 0 | 2 | 2 |

In Table 1, "x" means "don't care" and hence may have either a value "0" or a value "1".

As shown in Table 1, when the correlation judgement data CJ(P), the correlation judgement data CJ(F), the motion compensation judgement data VJ(P) and the motion compensation judgement data VJ(F) respectively have values of "1", "1", "1" and "1", the weighted coefficients P, C, F are respectively set to "1", "2" and "1". Specifically, in this case, the filter circuit filters the current macroblock data MD(C) by using both of the motion-compensated past macroblock data MB(P) and the motion-compensated future macroblock data MB(F). However, if either of the correlation judgement data CJ(F) and the motion compensation judgement data VJ(F) has a value "0" although both of the correlation judgement data CJ(P) and the motion compensation judgement data VJ(P) have a value "1", then the weighted coefficients P, C, F are respectively set to "2", "2", "0". Specifically, in this case, the filter circuit filters the current macroblock data MD(C) without using the motion-compensated future macroblock data MB(F) but by using only the motion-compensated past macroblock data MB(P). If either of the correlation judgement data CJ(P) and the motion compensation judgement data VJ(P) has a value "0" although both of the correlation judgement data CJ(F) and the motion compensation judgement data VJ(F) have a value "1", then the weighted coefficients P, C, F are respectively set to "0", "2", "2". Specifically, in this case, the filter circuit filters the current macroblock data MD(C) without using the motion-compensated past macroblock data MB(P) but by using only the motion-compensated future macroblock data MB(F).

At the second step, the arithmetic circuit 516 calculates the filtered current macroblock data MB'(C) based on the equation (2)

$$\begin{aligned} MB'(C) &= MB(C) - k[MB(C) - \{P \cdot MB(P) + C \cdot MB(C) + \\ & \quad F \cdot MB(F)\}/4] \\ &= (1-k)MB(C) + k[\{P \cdot MB(P) + C \cdot MB(C) + \\ & \quad F \cdot MB(F)\}/4] \\ &= (1-k)MB(C) + kMB''(C) \\ &= (1-k)MB(C) + k[\{P \cdot MB(P) + C \cdot MB(C) + F \cdot MB(F)\}/4] \\ &= (1-k)MB(C) + kMB''(C) \end{aligned} \quad (2)$$

where the value of filter coefficient k has a value within the range of $0 \leq k \leq 1$ and is a value supplied from the filter control circuit 524. This filter coefficient is a value changed in response to fluctuation of the gain levels of the gain control circuits 22R, 22G, 22B and is previously set as shown in Table 2, for example.

TABLE 2

| Gain Control Signal | value of k |
|---|---|
| 0 [dB] | 0.3 |
| 6 [dB] | 0.4 |
| 9 [dB] | 0.6 |
| 12 [dB] | 0.8 |
| 18 [dB] | 0.9 |
| 24 [dB] | 1.0 |
| 30 [dB] | 1.0 |

Specifically, when the gain is low, e.g, 0 dB, k=0.3 is established and hence MB(C):MB"(C)=0.7:0.3 is established. A ratio of the weighted means MB"(C) in the filtered data MB'(C) is relatively low. Thereafter, when the cameraman increases the gain to, for example, 12 dB, k=0.8 is established and hence MB(C);MB"(C)=0.2:0.8 is established. A ratio of the weighted means MB"(C) in the filtered data MB'(C) becomes relatively high. If the gain is further increased to, for example, 24 dB or more, k=1.0 is established and hence MB(C):MB"(C)=0:1.0 is established. The, as shown in equation (1), the filtered data MB'(C) becomes equal to the value of the weighted means MB"(C).

While in this embodiment the preset values shown in Table 2 are used as the values of the filter coefficient k, the value of the threshold coefficient k may be changed linearly in response to the gain levels of the gain control circuits 22R, 22G, 22B.

As described above, when the weighted means of the video data between frames is calculated by using equation (1), it is equivalent to a processing of filtering the current frame data by a low-pass filter in view of time and the calculation can reduce noises and so on as compared with those of a picture obtained from the current data as it is, which leads to an improved picture quality. Since, when the weighing is carried out as shown in Table 1, it is possible to prevent the calculation of the weighted mean between the macroblocks which are not properly motion-compensated and the weighted means between pixels having small correlation, the filtering of the arithmetic circuit 516 never deteriorates the picture quality of the filtered data MB'(C).

Moreover, since the arithmetic circuit 516 of the filter circuit 315 calculates the current macroblock data MB'(C) by using the filter coefficient k proportional to the gain control level in accordance with equation (2), it is possible to generate the macroblock data MB'(C) corresponding to the gain control level. In other words, proportion of the current macroblock data MB(C) used in the macroblock data MB'(C) and proportion of the weighted means MB"(C) used therein are changed in response to the threshold coefficient k proportional to the gain control level. Therefore, when the gain is increased, the value of the filter coefficient k becomes higher in response to the increase of the gain, which allows the proportion of the weighted means MB"(C) in the macroblock data MB'(C) to be increased. As a result, the more the gain is increased, the more the filtering characteristic is improved.

(operation of filter circuit)

In the filter circuit 315, the adder circuit 511, the absolute-value obtaining circuit 512 and the comparator circuit 513 judge the correlation between the video data MB(C) of the current data and the video data MB(P) of the past data with respect to every pixel to output the correlation judgement data CJ(P) to the comparator circuit 515 and the arithmetic circuit 516.

The adder circuit 519, the absolute-value obtaining circuit 520 and the comparator circuit 521 judge the correlation between the video data MB(C) of the current data and the video data MB(F) of the future data with respect to every pixel to output the correlation judgement data CJ(F) to the comparator circuit 523 and the arithmetic circuit 516.

The counter circuit 514 and the comparator circuit 515 for determining whether or not the motion compensation has been properly carried out determine whether or not correlation in every pixel between the video data MB(C) of the macroblock of the current data and the video data MB(P) of the corresponding macroblock of the past data is proper, i.e., the bit rate encoder 31 has properly carried out the motion compensation processing for these macroblocks, and then output the motion compensation judgement data VJ(P) to the arithmetic circuit 516.

The counter circuit 522 and the comparator circuit 523 for the motion compensation determine whether or not correlation in every pixel between the video data MB(C) of the macroblock of the current data and the video data MB(F) of the corresponding macroblock of the future data is proper, i.e., the bit rate encoder 31 (see FIG. 2) has properly carried out the motion compensation processing for these macroblocks, and then output the motion compensation judgement data VJ(F) to the arithmetic circuit 516.

Based on the respective logical values of the correlation judgement data CJ(P), CJ(F) and the motion compensation judgement data VJ(P), VJ(F), the arithmetic circuit 516 selects the weighted coefficients shown in Table 1 for the current data MB(C), the past data MB(P) and the future data MB(F). The arithmetic circuit 516 carries out the arithmetic processing shown by equation (1), filters the current data MB(C) and outputs it as the filtered data MB'(C).

Since, as described above, the filter circuit 315 filters data by using only the video data having a large correlation with the current data MB(C), the random noise having no correlation with the current data MB(C) or little correlation therewith is substantially removed and hence is prevented from influencing the weighted mean MB"(C). At this time, since the filter coefficient k changed in proportion to the gain increased by the cameraman allows the ratio of the weighted mean MB"(C) in the filtered data MB"(C) to be further increased, the random noise is substantially removed even if the gain is increased.

Since the filter circuit 315 carries out the filtering processing, the filtering of the filter circuit can suppress mosquito noise easily caused in the current data MB(C) when the DCT is carried out upon the compression coding processing, and can also improve the S/N ratio. Similarly, at this time, the threshold value used for determining whether or not the motion compensation carried out is proper is changed in proportion to the gain increased by the cameraman, and becomes higher.

While in this embodiment the filter circuit 315 is arranged so as to filter only the video data of the current data MB(C) corresponding to the B picture of the MPEG data, it may be arranged so as to filter the video data of other pictures.

While the filter circuit 315 filters the video data by using only the video data of the frames immediately preceding to and succeeding the current frame data MB(C), it may be arranged so as to filter the video data by further using video data of frames preceding to and succeeding the current data by two-frame amount in view of time.

While in this embodiment the processing of weighing the current data MB(C), the past data MB(P) and the future data MB(F) by the filter 315 is carried out with using an integer ratio in order to facilitate the processing, the data may be weighted with other values in order to improve the filtering characteristics.

Effect of the Invention

As described above, according to the imaging apparatus and the method of removing the noise of the video signal of the present invention, it is possible to subject the video data from which the random noise is substantially removed to the picture compression to store or transmit it.

It is the above filter circuit which removes the noise. The picture compression is carried out by using the video data from which the noise is removed. Therefore, even if the cameraman increases the gain of the video signal, the noise is prevented from being regarded as the motion in the picture compression processing at the succeeding stage.

Since the random noise caused by the increase of the gain is reduced and consequently allocation of bits to the random noise is reduced, it is possible to secure enough bits to the video data and to effectively prevent the picture quality from being deteriorated because of a small number of allocated bits upon the encoding processing.

Moreover, since one common circuit is employed as both of the motion compensation circuit for generating the motion-compensated macroblock data to be supplied to the filter circuit and the motion compensation circuit used for the bidirection encoding, it is not necessary to newly provide the motion compensation circuit for filtering the data and it is possible to realize a very simplified circuit arrangement.

According to the present invention,it is possible to provide the imaging apparatus which, even if the gain of the video signal is changed, prevents the bits from being intensively allocated to the noise upon bit allocation to the image pickup result.

Moreover, according to the present invention, it is possible to provide the imaging apparatus which, when the gain is changed, reduces the noise in response to the change of the gain.

I claim:

1. An imaging system having an imaging device, comprising:

a gain controller for controlling a gain of video data output from said imaging device;

a bit rate encoder having a filter for suppressing a random noise of the video data whose gain is controlled by said gain controller and having an encoder for encoding the video data filtered by said filter, said bit rate encoder including a first motion compensator for motion-compensating video data of a future frame temporally succeeding video data of a current frame and a second motion compensator for motion-compensating video data of a past frame temporally preceding said video data of said current frame, said filter filtering said video data of said current frame based on weighted macroblock data of the future frame motion-compensated by said first motion compensator and weighted macroblock data of the past frame motion-compensated by said second motion compensator; and a system controller for controlling said gain controller to set the gain of said video data to a preselected gain and for controlling said filter to set a filtering characteristic thereof in correspondence with said preselected gain.

2. The imaging system according to claim 1, wherein said system controller controls said filter so that the filtering characteristic is improved in response to the gain increased by said gain controller.

3. The imaging system according to claim 1, wherein said encoder of said bit rate encoder uses the macroblock data of the future frame motion-compensated by said first motion compensator and the macroblock data of the past frame motion-compensated by said second motion compensator to encode the macroblock data of said current frame.

4. The imaging system according to claim 3, wherein a common circuit serves as a motion compensator for said filter and said bit rate encoder.

5. The imaging system according to claim 1, wherein said filter generates weighted mean macroblock data having a weighted mean value of the macroblock data of said current frame weighted with a first weighting coefficient, the motion-compensated macroblock data of said future frame weighted with a second weighting coefficient, and the motion-compensated macroblock data of said past frame weighted with a third weighting coefficient.

6. The imaging system according to claim 5, wherein said filter generates filtered macroblock data from said current macroblock data and said weighted mean macroblock data.

7. The imaging system according to claim 5, wherein said filter selects said first weighting coefficient, said second weighting coefficient and said third weighting coefficient based on correlation between the macroblock data of said current frame and either the motion-compensated macroblock data of said future frame or the motion-compensated macroblock data of said past frame and based on how accurately said first motion compensator or said second motion compensator has carried out the motion compensation processing.

8. The imaging system according to claim 5, wherein, if there is no correlation between the macroblock data of said current frame and the motion-compensated macroblock data of said future frame, said second weighting coefficient is set to 0 and, if there is no correlation between the macroblock data of said current frame and the motion-compensated macroblock data of said past frame, said third weighting coefficient is set to 0.

9. The imaging system according to claim 6, wherein said filter, based on a filter coefficient generated to correspond to said preselected gain, changes a ratio of said current macroblock data to said weighted mean macroblock data in said filtered macroblock data output from said filter.

10. The imaging system according to claim 6, wherein said filter increases a ratio of said weighted mean macroblock in said filtered macroblock data in response to an increase in the gain of said gain controller.

11. The imaging system according to claim 5, wherein said first, second and third weighting coefficients are selected based on first correlation judgement data indicative of whether there is correlation between the macroblock data of said current frame and the motion-compensated macroblock data of said future frame, second correlation judgement data indicative of whether there is correlation between the macroblock data of said current frame and the motion-compensated macroblock data of said past frame, first motion compensation judgement data indicative of whether motion compensation of the macroblock data of the future frame motion-compensated by said first motion compensator is accurate, and second motion compensation judgement data indicative of whether motion compensation of the macroblock data of the past frame motion-compensated by said second motion compensator is accurate.

12. The imaging system according to claim 11, wherein said first correlation judgement data is based on a comparison of difference data between the macroblock data of said current frame and the motion-compensated macroblock data of said future frame and a predetermined threshold value, and wherein said filter changes said predetermined threshold value in response to the gain of said gain controller.

13. Encoding apparatus for encoding video data by a macroblock data unit, comprising:

a gain controlling a gain controller for controlling a gain of said video data;

a bit rate encoder comprising a filter for suppressing a noise of said video data whose gain is controlled by said gain controller and comprising an encoder for encoding the video data filtered by said filter, said bit rate encoder further comprising a first motion compensator for motion-compensating video data of a future frame temporally succeeding video data of a current frame and a second motion compensator for motion-compensating video data of a past frame temporally preceding said video data of said current frame, said filter filtering said video data of said current frame based on weighted macroblock data of the future frame motion-compensated by said first motion compensator and weighted macroblock data of the past frame motion-compensated by said second motion compensator; and a controller for controlling said gain controller so that said video data has a desired gain and for controlling said filter so that a filtering characteristic thereof corresponds to said desired gain.

14. A method of encoding a video data by a macroblock unit, comprising:

controlling a gain of said video data to a desired gain;

suppressing a noise by filtering said video data whose gain is controlled, by a filter whose filtering characteristic is changed in correspondence with said desired gain;

motion-compensating video data of a future frame temporally succeeding video data of a current frame and motion-compensating video data of a past frame temporally preceding said video data of said current frame, said filter filtering said video data of said current frame based on weighted macroblock data of the motion-compensated future frame and weighted macroblock data of the motion-compensated past frame; and encoding said filtered gain.

15. An imaging system having an imaging block, a signal processing block, and a recording and reproducing block, comprising:

a gain controller for optionally changing a gain of a video data;

a first motion compensator for motion-compensating video data of a future frame temporally succeeding video data of a current frame and a second motion compensator for motion-compensating video data of a past frame temporally preceding said video data of said current frame;

a filter circuit for filtering said video data of said current frame based on weighted macroblock data of the future frame motion-compensated by said first motion compensator and weighted macroblock data of the past frame motion-compensated by said second motion compensator; and a data compression circuit for compressing the filtered video data, wherein said filter circuit reduces a random noise included in said video data by changing a filtering characteristic in response to a change in said gain.

16. A method of removing a random noise included in a video data, comprising:

optionally changing a gain of said video data;

motion-compensating video data of a future frame temporally succeeding video data of a current frame and motion-compensating video data of a past frame temporally preceding said video data of said current frame;

generating filtered data from a predetermined video data by a filter having a filtering characteristic changed in response to a change in said gain, said filter filtering said video data of said current frame based on weighted macroblock data of the motion-compensated future frame and weighted macroblock data of the motion-compensated past frame;

compressing said filtered video data; and recording the compressed video data.

17. The imaging system according to claim 1, wherein said encoder of said bit rate encoder selectively uses the macroblock data of the future frame motion-compensated by said first motion compensator or the macroblock data of the past frame motion-compensated by said second motion compensator to encode the macroblock data of said current frame.

18. An imaging system having an imaging device, comprising:

a gain controller for controlling a gain of video data output from said imaging device;

a bit rate encoder having a filter for suppressing a random noise of the video data whose gain is controlled by said gain controller and having an encoder for encoding the video data filtered by said filter, said bit rate encoder including a first motion compensator for motion-compensating video data of a future frame temporally succeeding video data of a current frame and a second motion compensator for motion-compensating video data of a past frame temporally preceding said video data of said current frame, said filter filtering said video data of said current frame based on macroblock data of the future frame motion-compensated by said first motion compensator and macroblock data of the past frame motion-compensated by said second motion compensator, said encoder encoding the filtered video data of said current frame by using the macroblock data of the future frame motion-compensated by said first motion compensator and by using the macroblock data of the past frame motion-compensated by said second motion compensator; and a system controller for controlling said gain controller to set the gain of said video data to a preselected gain and for controlling said filter to set a filtering characteristic thereof in correspondence with said preselected gain.

19. Encoding apparatus for encoding video data by a macroblock data unit, comprising:

a gain controller for controlling a gain of said video data;

a bit rate encoder comprising a filter for suppressing a noise of said video data whose gain is controlled by said gain controller and comprising an encoder for encoding the video data filtered by said filter, said bit rate encoder further comprising a first motion compensator for motion-compensating video data of a future frame temporally succeeding video data of a current frame and a second motion compensator for motion-compensating video data of a past frame temporally preceding said video data of said current frame, said filter filtering said video data of said current frame based on macroblock data of the future frame motion-compensated by said first motion compensator and macroblock data of the past frame motion-compensated by said second motion compensator, said encoder encoding the filtered video data of said current frame by using the macroblock data of the future frame motion-compensated by said first motion compensator and by using the macroblock data of the past frame motion-compensated by said second motion compensator; and a controller for controlling said gain controller so that said video data has a desired gain and for controlling said filter so that a filtering characteristic thereof corresponds to said desired gain.

20. A method of encoding a video data by a macroblock unit, comprising:

controlling a gain of said video data to a desired gain;

suppressing a noise by filtering said video data whose gain is controlled, by a filter whose filtering characteristic is changed in correspondence with said desired gain;

motion-compensating video data of a future frame temporally succeeding video data of a current frame and motion-compensating video data of a past frame temporally preceding said video data of said current frame, said filter filtering said video data of said current frame based on macroblock data of the motion-compensated future frame and macroblock data of the motion-compensated past frame;

encoding the filtered video data of said current frame by using the macroblock data of the motion-compensated future frame and by using the macroblock data of the motion-compensated past frame; and encoding said filtered gain.

21. An imaging system having an imaging block, a signal processing block, and a recording and reproducing block, comprising:

a gain controller for optionally changing a gain of a video data;

a first motion compensator for motion-compensating video data of a future frame temporally succeeding video data of a current frame and a second motion compensator for motion-compensating video data of a past frame temporally preceding said video data of said current frame;

a filter circuit for filtering said video data of said current frame based on macroblock data of the future frame motion-compensated by said first motion compensator and macroblock data of the past frame motion-compensated by said second motion compensator; and a data compression circuit for compressing the filtered video data of said current frame by using the macroblock data of the future frame motion-compensated by said first motion compensator and by using the macroblock data of the past frame motion-compensated by said second motion compensator, wherein said filter circuit reduces a random noise included in said video data by changing a filtering characteristic in response to a change in said gain.

22. A method of removing a random noise included in a video data, comprising:

optionally changing a gain of said video data;

motion-compensating video data of a future frame temporally succeeding video data of a current frame and motion-compensating video data of a past frame temporally preceding said video data of said current frame;

generating filtered data from a predetermined video data by a filter having a filtering characteristic changed in response to a change in said gain, said filter filtering said video data of said current frame based on macroblock data of the motion-compensated future frame and macroblock data of the motion-compensated past frame;

compressing the filtered video data of said current frame by using the macroblock data of the motion-compensated future frame and by using the macroblock data of the motion-compensated past frame; and recording the compressed video data.

* * * * *